US005228194A

United States Patent [19]

Broughton et al.

[11] Patent Number: 5,228,194

[45] Date of Patent: Jul. 20, 1993

[54] MAINE PROPULSION DEVICE WITH CLOSED DECK

[75] Inventors: George L. Broughton, Zion, Ill.; Paul W. Breckenfeld, Kenosha, Wis.

[73] Assignee: Outboard Marine Corporation, Waukegan, Ill.

[21] Appl. No.: 987,806

[22] Filed: Dec. 9, 1992

Related U.S. Application Data

[60] Division of Ser. No. 734,896, Jul. 24, 1991, Pat. No. 5,191,860, which is a division of Ser. No. 583,008, Sep. 14, 1990, Pat. No. 5,048,468, which is a continuation of Ser. No. 509,609, Apr. 16, 1990, abandoned.

[51] Int. Cl.[5] .................... B23B 5/28

[52] U.S. Cl. .................... 29/888.01; 29/888.061

[58] Field of Search .................... 29/888.01, 88.061, 428

[56] References Cited

U.S. PATENT DOCUMENTS 4,545,101 10/1985 Hilts .................... 29/888.061

*Primary Examiner*—Noah P. Kamen

*Attorney, Agent, or Firm*—Michael, Best & Friedrich

[57] ABSTRACT

Disclosed herein is an engine comprising a closed deck cylinder block including a cylinder bore having an outer end, a counter bore at the outer end of the cylinder bore, and an outer wall including an outer cylinder head mounting surface extending from the counter bore, a coolant jacket located in spaced surrounding relation to the cylinder bore and being defined in part by the outer wall, and a passage located in the outer wall and communicating between the cylinder head mounting surface and the coolant jacket, a cylinder liner received in the cylinder bore and defining, with the counter bore, a U-shaped annular groove in the cylinder head mounting surface, a cylinder head including a cylinder block mounting surface engaged with the cylinder head mounting surface of the cylinder block, an interior coolant jacket, and a passage extending from the coolant jacket in the cylinder head to the cylinder block mounting surface of the cylinder head and communicating with the passage in the cylinder block.

4 Claims, 2 Drawing Sheets

MAINE PROPULSION DEVICE WITH CLOSED DECK

This is a division of co-pending application Ser. No. 734,896, filed Jul. 24, 1991, now U.S. Pat. No. 5,191,860, which application Ser. No. 734,896, in turn, is a division of application Ser. No. 583,008, filed Sep. 14, 1990, now U.S. Pat. No. 5,048,468; which application Ser. No. 583,008 is a continuation of application Ser. No. 509,609, filed Apr. 16, 1990, now abandoned.

BACKGROUND OF THE INVENTION

The invention relates to marine propulsion devices, and, more particularly, to marine propulsion device engine constructions and to methods of manufacturing such engines.

In cylinder blocks with "open deck" constructions, the water jacket surrounding the cylinder bore or bores is exposed at the cylinder head face and is closed by the cylinder head. In cylinder blocks with "closed deck" constructions, the water jacket is substantially enclosed by the cylinder block and is not exposed at the cylinder head face. An example of a cylinder block with a closed deck construction is disclosed in wallgren U.S. Pat. No. 2,553,222, issued May 15, 1951.

It is known to seal the joint between a cylinder head and a cylinder block having an open deck construction with a rubber O-ring. Such an arrangement is disclosed in Takada U.S. Pat. No. 4,494,491, issued Jan. 22, 1985.

Attention is also directed to the following U.S. Patents:

| | | |
|---|---|---|
| I. Ornberg | 1,791,572 | 02/10/31 |
| Weaver, et al. | 2,111,828 | 03/22/38 |
| D. Holley | 2,757,650 | 08/07/56 |
| Albinson, et al. | 3,161,182 | 12/15/64 |
| Stefan | 3,228,381 | 01/11/66 |
| Walsh | 3,246,637 | 04/19/66 |
| Scherenberg, et al. | 3,363,608 | 01/16/68 |
| Kueny, et al. | 3,667,431 | 06/06/72 |
| Baster | 3,385,273 | 05/28/68 |
| Olson, et al. | 3,481,316 | 12/02/69 |
| Kubis | 4,108,135 | 08/22/78 |
| Brown | 4,357,912 | 11/09/82 |
| Hauser, Jr. | 4,399,783 | 08/23/83 |
| Kazenmaier, et al. | 4,417,549 | 11/29/83 |
| Hundertmark | 4,674,449 | 06/23/87 |

Attention is also directed to the following foreign patents: British Patent No. 582,376; French Patent No. 718,174; British Patent No. 1,265,980; and British Patent No. 2,069,046.

SUMMARY OF THE INVENTION

The invention provides an engine comprising a closed deck cylinder block including a cylinder bore having an outer end, a counter bore at the outer end of the cylinder bore, and an outer wall including an outer cylinder head mounting surface extending from the counter bore, a cylinder liner received in the cylinder bore and defining, with the counter bore, a U-shaped annular groove in the cylinder head mounting surface, a cylinder head including a cylinder block mounting surface engaged with the cylinder head mounting surface of the cylinder block, a seal member located in the annular groove and engaged with the cylinder block and the cylinder head, and a plurality of fasteners extending between and tightly securing together the cylinder block and the cylinder head.

The invention also provides an engine comprising a closed deck cylinder block including a cylinder bore having an axis and an outer end, a counter bore at the outer end of the cylinder bore and including a bottom surface and a cylindrical surface extending axially outwardly from the bottom surface and having an outer end, and an outer wall including an outer cylinder head mounting surface extending from the outer end of the cylindrical surface of the counter bore, a cylinder liner received in the cylinder bore and having an outer cylindrical surface engaged in part with the cylinder bore and an outer end coplanar with the cylinder head mounting surface, whereby to define a U-shaped annular groove defined by the outer cylindrical surface of the cylinder liner, and by the bottom surface and the cylindrical surface of the counter bore, a cylinder head including a cylinder block mounting surface engaged with the cylinder head mounting surface of the cylinder block, a seal member located in the annular groove and tightly engaged with the cylinder block and with the cylinder head, and a plurality of fasteners extending between and tightly securing together the cylinder block and the cylinder head.

The invention also provides an engine comprising a closed deck cylinder block including a cylinder bore having a outer end, an outer wall including a cylinder head mounting surface extending from the outer end of the cylinder bore, a coolant jacket located in spaced surrounding relation to the cylinder bore and being defined in part by the outer wall, and a passage located in the outer wall and communicating between the cylinder head mounting surface and the coolant jacket, a cylinder head including a cylinder block mounting surface engaged with the cylinder head mounting surface of the cylinder block, an interior coolant jacket, and a passage extending from the coolant jacket in the cylinder head to the cylinder block mounting surface of the cylinder head and communicating with the passage in the cylinder block, an annular seal member located in one of the passages in the cylinder block and the cylinder head and including an annular valve seat surface, a valve member including a surface engagable with the valve seat surface of the seal member to releasably prevent coolant flow through the coolant flow passages between the coolant jacket in the cylinder block and the coolant jacket in the cylinder head, and a plurality of fasteners extending between and tightly securing together the cylinder block and the cylinder head.

The invention also provides an engine comprising a closed deck cylinder block including a cylinder bore having an outer end, an outer wall including a cylinder head mounting surface extending from the outer end of the cylinder bore, a coolant jacket located in spaced surrounding relation to the cylinder bore and being defined in part by the outer wall, and a passage located in the outer wall and communicating between the cylinder head mounting surface and the coolant jacket and being restricted in size as compared to the size of the coolant jacket, a cylinder head including a cylinder block mounting surface engaged with the cylinder head mounting surface of the cylinder block, an outer surface spaced from the cylinder block mounting surface of the cylinder head, which cylinder head also includes therein an interior coolant jacket with a chamber portion having an opening located in the outer surface of the cylinder head and communicating with the atmosphere, a passage extending from the chamber portion to the cylinder block mounting surface of the cylinder head and communicating with the passage in the cylinder block, and a counter bore at the cylinder block mounting surface of the cylinder head in surrounding relation to the passage in the cylinder head, an annular seal member located in the counter bore in the cylinder head and having opposed surfaces sealingly engaging the cylinder block and the cylinder head, and an annular inner valve seat surface, a valve member located in the chamber portion of the coolant jacket in the cylinder head and including a surface engagable with the valve seat surface of the seal member t releasably prevent coolant flow through the passages between the coolant jacket in the cylinder block and the coolant jacket in the cylinder head, a removable plug located in the opening in the cylinder head and closing the chamber portion to the atmosphere, a spring located between the valve member and the plug and biasing the valve member surface against the valve seat surface, and a plurality of fasteners extending between and tightly securing together the cylinder block and the cylinder head.

The invention also provides an engine comprising a closed deck cylinder block including a cylinder bore having an outer end, a counter bore at the outer end of the cylinder bore, an outer wall including an outer cylinder head mounting surface extending from the counter bore, a coolant jacket located in spaced surrounding relation to the cylinder bore and being defined in part by the outer wall, and a passage located in the outer wall and communicating between the cylinder head mounting surface and the coolant jacket, a cylinder liner received in the cylinder bore and defining, with the counter bore, a U-shaped annular groove in the cylinder head mounting surface, a cylinder head including a cylinder block mounting surface engaged with the cylinder head mounting surface of the cylinder block, an interior coolant jacket, and a passage extending from the coolant jacket in the cylinder head to the cylinder block mounting surface of the cylinder head and communicating with the passage in the cylinder block, a first seal member located in the annular groove and sealingly engaged with the cylinder block and the cylinder head, an annular second seal member located in one of the passages in the cylinder block and the cylinder head, sealingly engaged with the cylinder block and the cylinder head, and including an annular valve seat surface, a valve member including a surface engagable with the valve seat surface of the second seal member to releasably prevent coolant flow through the passages between the coolant jacket in the cylinder block and the coolant jacket in the cylinder head, and a plurality of fasteners extending between and tightly securing together the cylinder block and the cylinder head.

The invention also provides an engine comprising a closed deck cylinder block including a cylinder bore having an axis and an outer end, a counter bore at the outer end of the cylinder bore and including a bottom surface and a cylindrical surface extending axially outwardly from the bottom surface and having an outer end, an outer wall including a cylinder head mounting surface extending from the outer end of the cylindrical surface of the counter bore, a coolant jacket located in spaced surrounding relation to the cylinder bore and being defined in part by the outer wall, and a passage located in the outer wall and communicating between the cylinder head mounting surface and the coolant jacket and being restricted in size as compared to the size of the coolant jacket, a cylinder liner received in the cylinder bore and having an outer cylindrical surface engaged in part with the cylinder bore and an outer end coplanar with the cylinder head mounting surface, whereby to define a U-shaped annular groove defined by the outer cylindrical surface of the cylinder liner, and by the bottom surface and the cylindrical surface of the counter bore, a cylinder head including a cylinder block mounting surface engaged with the cylinder head mounting surface of the cylinder block, an outer surface spaced from the cylinder block mounting surface of the cylinder head, which cylinder head also includes therein an interior coolant jacket with a chamber portion having an opening located in the outer surface of the cylinder head and communicating with the atmosphere, a passage extending between the chamber portion and the cylinder block mounting surface surface of the cylinder head and communicating with the passage in the cylinder block, and a counter bore at the cylinder block mounting surface of the cylinder head in surrounding relation to the passage in the cylinder head, a first seal member located in the annular groove and sealingly engaged with the cylinder block and the cylinder head, an annular second seal member located in the counter bore in the cylinder head and having opposed surfaces sealingly engaging the cylinder block and the cylinder head, and an annular inner valve seat surface, a valve member located in the chamber portion of the coolant jacket in the cylinder head and including a surface engagable with the valve seat surface of the second seal member to releasably prevent coolant flow through the passages between the coolant jacket in the cylinder block and the coolant jacket in the cylinder head, a removable plug located in the opening in the cylinder head and closing the chamber portion to the atmosphere, a spring located between the valve member and the plug and biasing the valve member surface against the valve seat surface, a sealing medium between the cylinder head and the cylinder block, and a plurality of fasteners extending between and tightly securing together the cylinder block and the cylinder head, The invention also provides a method of fabricating a cylinder block, which method comprise the steps of casting the cylinder block with a non-machined crankcase end surface with a non-machined cylinder head end surface in spaced relation to said non-machined crankcase end surface, and with a non-machined cylinder bore extending from said non-machined cylinder head end surface, machining the non-machined crankcase end surface to provide a finished surface located in a plane adapted to contain the axis of a crankshaft to be supported by the cylinder block, and boring the non-machined cylinder bore to provide a finished cylinder bore with a shoulder which is located at the end of the finished cylinder bore remote from the non-machined cylinder head end surface and at a first given distance from the crankshaft axis and with a counter bore at the other end thereof and adjacent the non-machined cylinder head end surface and including a bottom surface at a second given distance from the crankshaft axis by employing a unitary boring bar having a first part which produces the shoulder and a second part which simultaneously produces the counter bore.

The invention also provides a method of fabricating a cylinder block assembly including a cylinder block and a cylinder linder, which method comprises the steps of casting the cylinder block with a non-machined crankcase end surface having a generally semi-cylindrical crankcase recess with an axis of revolution and with a diameter passing through the axis, with a non-machined cylinder head end surface in spaced relation to said non-machined crankcase end surface, and with a non-machined cylinder bore extending from said non-machined cylinder head end surface and communicating with said crankcase recess, machining the non-machined crankcase end surface to provide a finished crankcase cover mounting surface co-planar with the diameter of the crankcase recess, boring the non-machined cylinder bore to provide a finished cylinder bore with a shoulder which is located at the end of the finished cylinder bore remote from the non-machined cylinder head end surface and at a first given distance from the axis and with a counter bore at the other end thereof and adjacent the non-machined cylinder head end surface and including a bottom surface at a second given distance from said axis by employing a unitary boring bar having a first part which produces the shoulder and a second part which simultaneously produces the counter bore, inserting the cylinder liner into the finished cylinder bore with a first end thereof in engagement with the shoulder and with a second end thereof adjacent the non-machined cylinder head end surface, and machining the non-machined cylinder head end surface and the second end of the cylinder liner to provide planar machined cylinder head mounting surface having therein an annular U-shaped recess located in surrounding relation to the second end of the cylinder liner and to locate the cylinder head mounting surface at a third given distance from the axis.

Other features and advantanges of the invention will become apparent to those skilled in the art upon review of the following detailed description, claims, and drawings.

Figure 1:
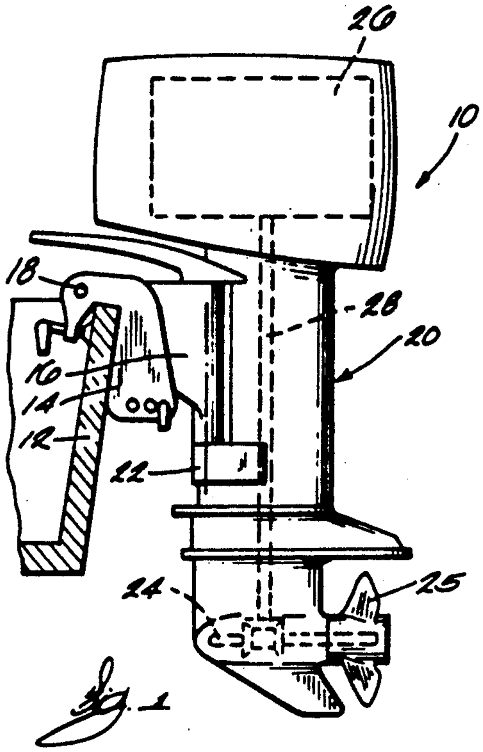
FIG. 1 is a side elevational view, partially in section, of a marine propulsion device embodying various of the features of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Shown in FIG. 1 is a marine propulsion device 10 which comprises a mounting assembly mounted on the transom 12 of a boat. While various suitable mounting assemblies can be used, in the illustrated construction, the mounting assembly includes a transom bracket 14 fixedly mounted on the transom 12, and a swivel bracket 16 mounted on the transom bracket 11 for pivotal movement relative thereto about a generally horizontal tilt axis 18.

The marine propulsion device 10 also comprises a propulsion unit 20 mounted on the swivel bracket 16 for pivotal movement relative thereto about a generally vertical steering axis 22, and for common movement therewith about the tilt axis 18. The propulsion unit 20 includes a rotatably mounted propeller shaft 24 carrying a propeller 25, and an internal combustion engine 26 (shown schematically in FIG. 1) drivingly connected to the propeller 25 by a conventional drive train 28.

Figure 2:
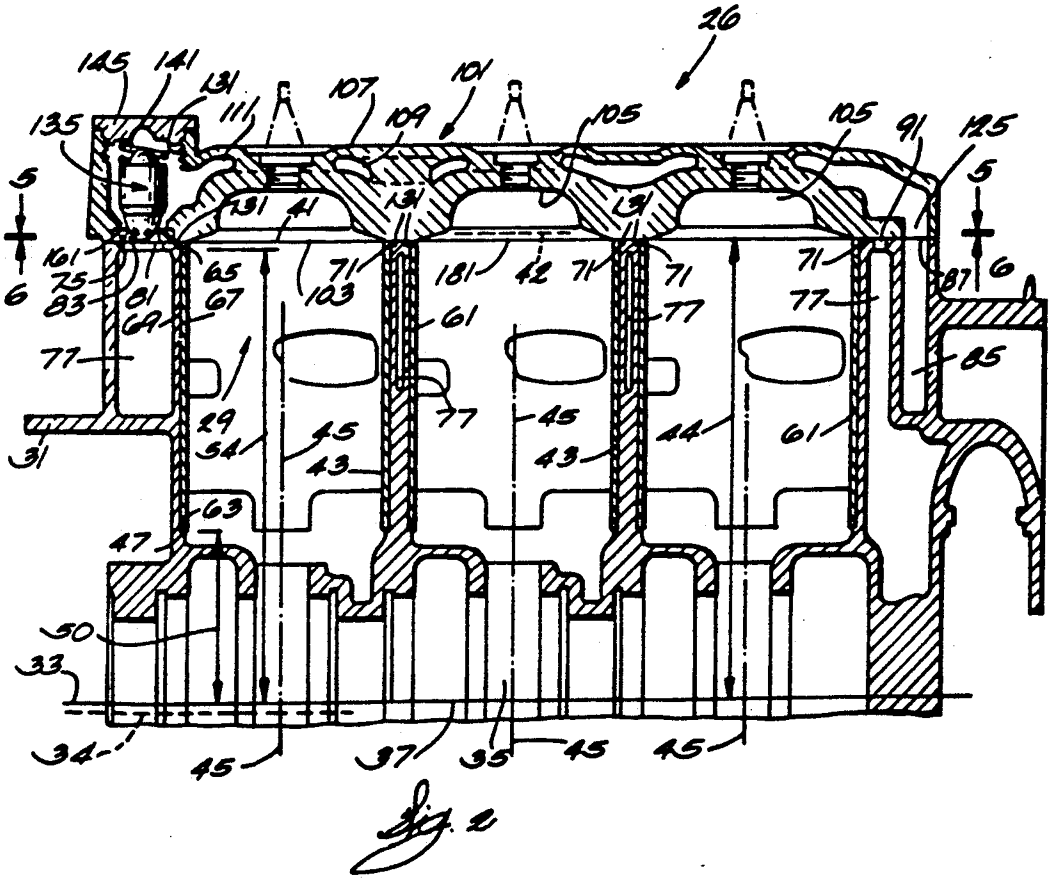
FIG. 2 is a partial, cross sectional view of the engine of the marine propulsion device shown in FIG. 1
Figure 7:
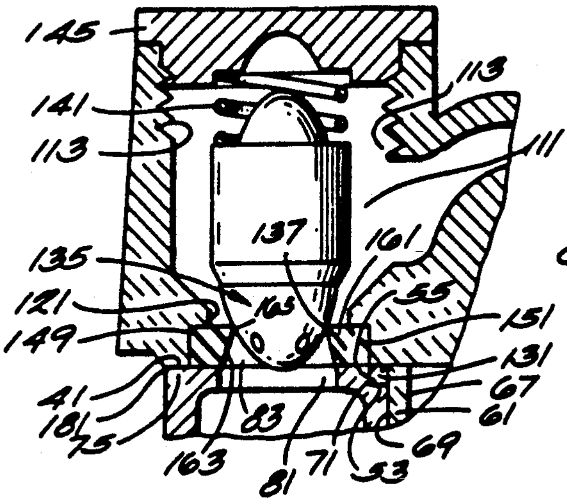
FIG. 7 is an enlarged view of another portion of the engine shown in FIG. 2.
Figure 6:
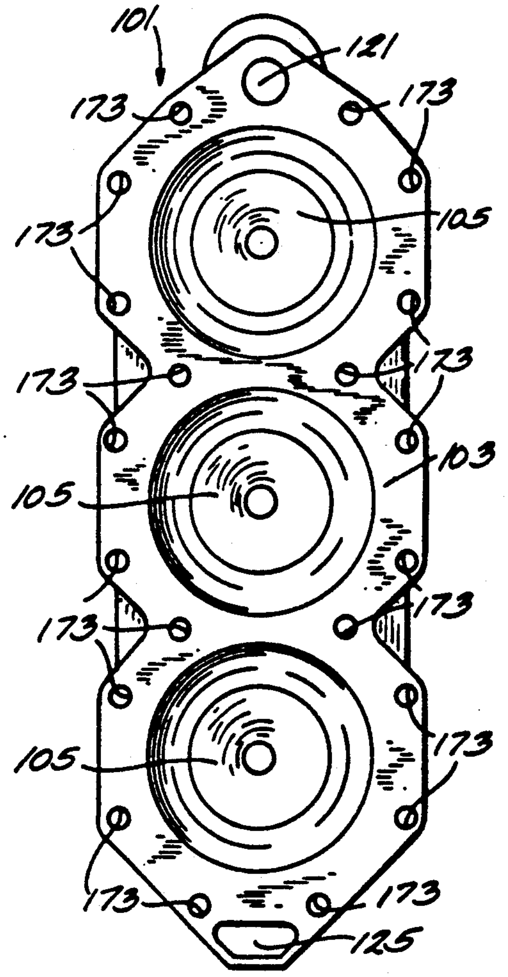
FIG. 6 is a sectional view taken along line 6—6 of FIG. 2.
Figure 5:
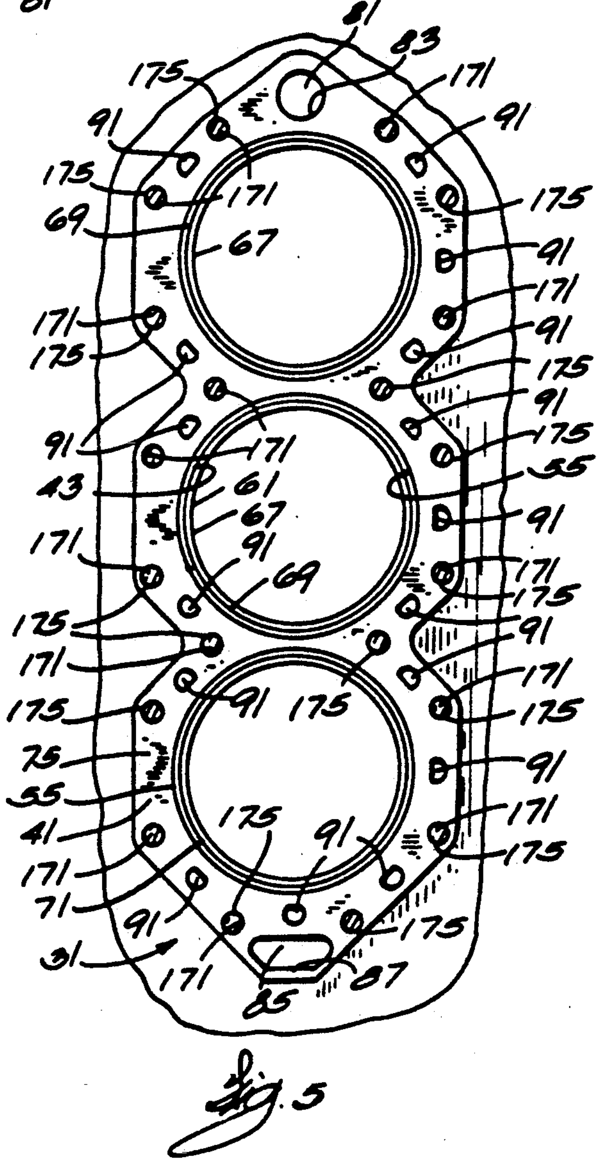
FIG. 5 is a sectional view taken along line 5—5 of FIG. 2.

As shown best in FIG. 2 the engine 26 comprises a closed deck cylinder or engine block assembly 29 which includes an engine or cylinder block 31 which is preferably cast from aluminum in the lost foam process and which is provided with a machined planar crankcase end or crankcase cover mounting surface 33 which is machined from a cast crankcase end surface 34 (shown in dotted outline) and which has therein a semi-cylindrical crankshaft recess 35 with the diametric plane thereof containing the coincident axes 37 of revolution of the recess 35 and of the crankshaft (not shown), and being co-planar with the machined crankcase cover mounting surface 33.

In addition, the engine block 31 includes a machined planar, outer or cylinder head mounting surface 41 which is machined from a cast cylinder head end surface 42 (shown in dotted outline), and which is spaced from the crankcase cover mounting surface 33 at a predetermined or given perpendicular distance 44 to the crankshaft axis 37.

Figure 3:
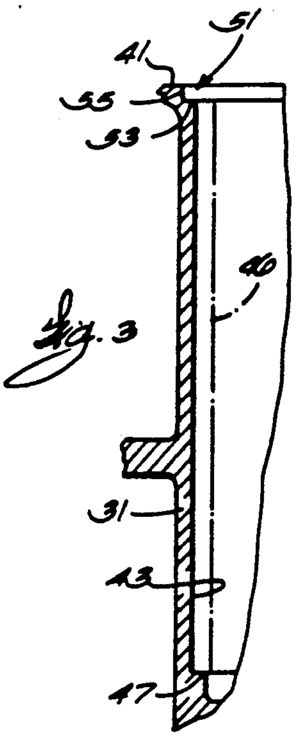
FIG. 3 is an enlarged view of a portion of FIG. 2.

The engine block 31 also includes one or more annular wall(s) which define respective machined cylindrical bore(s) 43 which are machined from cast cylindrical bore(s) 46 (shown in dotted outline in FIG. 3), and which extend inwardly from and perpendicular to the machined cylinder head mounting surface 41 and respectively include an axis 45 intersecting the crankshaft axis 37. Each case cylindrical bore 46 is machined (see especially FIG. 3) to form a shoulder 47 which is located remotely from the machined cylinder head mounting surface 41 and in a plane perpendicular to the cylinder axis 45 and at a predetermined or given axial distance 50 from the crankshaft axis 37.

The cylinder block 31 also includes, adjacent the machined cylinder head mounting surface 41, a counter bore 51 having a bottom surface 53 located in a plane perpendicular to the cylinder axis 45 and at a given or predetermined axial distance 54 from the crankshaft axis 37, and a cylindrical wall 55 concentric with the cylinder axis 45.

The cylinder block assembly 29 also includes (see FIG. 2) one or more ferrious cylinder liner(s) 61 which are in the form of cylindrical sleeve(s) having opposite first and second ends 63 and 65 and inner and outer cylindrical surfaces 67 and 69 and which are respectively press fit into the machined cylindrical bore(s) 43 so that the first end 63 engages the shoulder 47 and so that the second end 65 is co-planar with, and forms a part of, the machined cylinder head mounting surface 41. The inner cylindrical surface 67 provides a wear resistant cylinder bore.

When thus assembled, there is provided in the cylinder head mounting surface 41, one or more annular groove(s) 71 respectively formed by the associated cylinder liner outer cylindrical surface 69, by the associated counter bore bottom surface 53 and by the associated counter bore cylindrical surface 55.

The machined cylinder block mounting surface 41 is provided in the cylinder block 31 by an outer or top wall 75 which extends outwardly from the counter bore cylindrical surface 55 in unbroken fashion, except as will be described hereinafter, to provide the closed deck feature.

The cylinder block 31 also includes suitable wall means which includes the outer or top wall 75 and which defines an engine coolant jacket 77 which surrounds the annular wall(s) defining the cylindrical bore(s) 43 of the engine block.

The cylinder block 31 is also provided with a suitable coolant inlet passage (not shown) communicating with a coolant supply pump (not shown) and is also provided with a single coolant outlet passage 81 which extends through the outer wall 75 and communicates between the coolant jacket 77 and a port 83 in the cylinder head mounting surface 41.

The cylinder block 31 also includes a suitable coolant overboard passage 85 which terminates, at one end, in a port 87 in the cylinder head mounting surface 41. The ports 83 and 87 have a size which, particularly as compare to the size of the open coolant jacket annulus of the prior art, is relatively very small.

Figure 4:
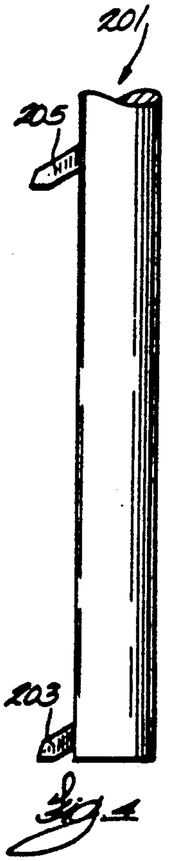
FIG. 4 is a fragmentary view of a tool for forming the engine block portion shown in FIG. 3.

As it is contemplated that the cylinder block 31 will be cast employing the lost foam process, the outer or top wall 75 also includes (see FIG. 4) a series of passages 91 which, individually, are of relatively small size, which communicate between the cylinder head mounting surface 41 and the coolant jacket 77 and which afford flow of sand into the coolant jacket void in the lost foam pattern prior to casting.

The engine 26 also includes a cylinder head 101 which is preferably fabricated from aluminum using the lost foam process and which includes a planar machined cylinder block mounting surface 103 which is tightly engaged with the machined cylinder head mounting surface 41 of the cylinder block 31, and which is generally unbroken except for one or more cylinder head cavity(ies) or recess(es) 105 registering with and communicating with the cylinder bore(s) 67 in the cylinder liner 61, and except as will otherwise be hereinafter disclosed.

In addition, the cylinder head 101 includes an outer surface 107 spaced from the cylinder block mounting surface 103. Located interiorly of the cylinder head 101 is a cylinder head coolant jacket 109 which extends in close proximity to the cavity(ies) or recess(es) 105 and includes, at one end of the cylinder head 101, a chamber portion 111 having an opening 113 in the outer surface 107 of the cylinder head 101. In addition, the cylinder head 101 includes, at the same end thereof, a coolant inlet 121 passage which communicates between the chamber portion 111 of the cylinder head cooling jacket 109 and the cylinder block mounting surface 103 and which is located in communicating alignment with the coolant passage port 83 in the cylinder block mounting surface 41.

Still further, in addition, the cylinder head 101, at the other end thereof, includes a coolant discharge passage 125 which communicates between the cylinder head coolant jacket 109 and the cylinder block mounting surface 103 and which is located in communicating alignment with the overboard port 87 in the cylinder head mounting surface 41 of the cylinder block 31.

The engine 26 also includes, in each annular grove 71, an O-ring 131 which is fabricated of suitable rubber or rubber-like material and which sealingly engages the counter bore bottom surface 53 in the cylinder block 31 and the cylinder block mounting surface 103 of the cylinder head 101 so as to seal the associated combustion chamber or cylinder against leakage.

The engine 26 also includes spring biased valve member 13 which is located in the chamber portion 111 of the cylinder head coolant jacket 109 and which includes a surface 137 engagable with a valve seat in the coolant inlet passage 121 to releasably control coolant flow from the cylinder block coolant jacket 77 to the cylinder head coolant jacket 109.

The valve member 135 is biased to the position closing the coolant inlet passage 121, i.e., to the position preventing coolant flow, by a helical spring 141 (or other suitable means) which is located between the valve member 135 and a plug member 145 which is threaded into the opening 113 or otherwise suitably assembled to the cylinder head 101 to close the opening 113 and to provide support for the spring 141.

The engine 26 also includes means for sealing the communication between the coolant passages 81 and 121 against leakage and for providing a valve seat against which the valve member 135 is engagable to prevent or limit flow through the coolant passages 81 and 121. While other constructions can be employed, in the disclosed construction, such means comprises formation of the cylinder head 101 with a counter bore 149 extending inwardly of the cylinder head 101 from the cylinder block mounting surface 103 in surrounding relation to the coolant passage 121 and including a transverse wall, or shoulder 151 spaced from the cylinder block mounting surface 103.

Located in the counter bore 149 and engaged between the transverse wall or shoulder 151 in the cylinder head 101 and the cylinder head mounting surface 41 on the cylinder block 31 is an annular seal member 161 which is fabricated of resilient material such as rubber and which includes an annular wall which defines a central passage 163 permitting coolant flow therethrough and which provides an annular valve seat surface 165.

The engine also includes a series of fasteners in the form of bolts 171 which extend through suitable apertures 173 in the cylinder head 101 and which extend into threaded blind holes 175 which are located in the cylinder block 31 and which terminate in the cylinder head mounting surface 41 of the cylinder block 31. The bolts 171 are sufficiently numerous and are spaced from each other and relative to the cylinder bores 67 to insure tight engagement of the cylinder head and cylinder block mounting surfaces 41 and 103 and to insure tight sealing engagement of the O-rings 131 and sealing member 161 between the cylinder block 31 and cylinder head 101.

The engine 26 also includes an aerobic sealant 181 which is located between the cylinder head and cylinder block mounting surfaces 41 and 103 and which is applied as a liquid to one or both of the cylinder head and cylinder block mounting surfaces 41 and 103 prior to their assembly.

As a consequence of the foregoing, there is provided a closed deck engine construction in which the cylinders or combustion chambers are adequately sealed by the O-rings 131 and in which the seal member 161 also adequately seals the flow passages 81 and 121 affording coolant flow from the cylinder block 31 to the cylinder head 101. The proximity of at least two of the bolts 171 to the coolant overboard passages 85 and 125 in the cylinder block 31 and cylinder head 101, together with the relatively small size thereof, coupled with the absence of material pressure in the coolant in the overboard passages 85 and 125, adequately prevents leakage of coolant from the connection between the overboard passages 85 and 125.

The cylinder block mounting surface 103 of the cylinder head 101 closes the openings 91 to prevent loss of coolant from the coolant jacket 77. The proximity of the bolts 171 to the openings 91 serves to adequately seal the cylinder head 101 to the cylinder block 31 to prevent coolant loss or leakage.

The engine 26 is fabricated by a method which simultaneously effects machining of the cylinder bore 43, establishment of the location of the shoulder 47, and provision of the cylinder counter bore 51 including the bottom wall 53 at the desired predetermined distances 48 and 50 from the crankshaft axis 37 in a single operation.

More specifically, the method of fabricating the cylinder block assembly 29 comprises the steps of casting the cylinder block 31 with the non-machined crankcase end surface 34, with a non-machined, cast cylinder head end surface 42 in spaced relation to the non-machined crankcase end surface 34, and with a non-machined, cast cylinder bore 46 extending from the non-machined cylinder head end surface 42 and communicating with the crankcase recess 35, machining the non-machined crankcase end surface 34 to provide the machined or finished surface 33 which is located in a plane adapted to contain the axis of a crankshaft to be supported by the cylinder block, which crankshaft axis is preferably coaxial with the axis of the crankcase recess 35, boring the non-machined cylinder bore 46 to provide the machined cylinder bore 43 with the shoulder 47 which is located at the end of the machined cylinder bore 43 remote from the non-machined cylinder head end surface 42 and at the given distance 50 from the crankshaft axis 37 and with the counter bore 51 at the other end thereof and adjacent the non-machined cylinder head end surface 42 and including the bottom surface 53 at the given distance 54 from the crankshaft axis 37 by employing a unitary boring bar 201 having a first part 203 which produces the shoulder 47 and a second part 205 which simultaneously produces the counter bore 57, inserting the cylinder liner 61 into the finished cylinder bore 43 with the first end 63 thereof in engagement with the shoulder 47 and with the second end 65 thereof adjacent the non-machined cylinder head end surface 42, and machining the non-machined cylinder head end surface 42 and the second end 65 of the cylinder liner 61 to provide the planar machined cylinder head mounting surface 41 which has therein the annular U-shaped recess or groove 71 located in surrounding relation to the second end 65 of the cylinder liner 61, and which is located at the predetermined or given distance 48 from the crankshaft axis 37.

The invention is equally applicable to V-block engines and to in-line engines.

Various of the features of the invention are set forth in the following claims.

We claim:

1. A method of fabricating a cylinder block, said method comprising the steps of casting the cylinder block with a non-machined crankcase end surface, with a non-machined cylinder head end surface in spaced relation to said non-machined crankcase end surface, and with a non-machined cylinder bore extending from said non-machined cylinder head end surface, machining the non-machined crankcase end surface to provide a finished surface located in a plane adapted to contain the axis of a crankshaft to be supported by the cylinder block, and boring the non-machined cylinder bore to provide a finished cylinder bore with a shoulder which is located at the end of the finished cylinder bore remote from the non-machined cylinder head end surface and at a first given distance from the crankshaft axis and with a counter bore at the other end thereof and adjacent the non-machined cylinder head end surface and including a bottom surface at a second given distance from the crankshaft axis by employing a unitary boring bar having a first part which produces the shoulder and a second part which simultaneously produces the counter bore.

2. A method in accordance with claim 1 wherein said casting step includes casting the cylinder block with a non-machined closed end cylinder head surface.

3. A method of fabricating a cylinder block assembly including a cylinder block and a cylinder liner, said method comprising the steps of casting the cylinder block with a non-machined crankcase end surface having a generally semi-cylindrical crankcase recess with an axis of revolution and with a diameter passing through the axis, with a non-machined cylinder head end surface in spaced relation to said non-machined crankcase end surface, and with a non-machined cylinder bore extending from said non-machined cylinder head end surface and communicating with said crankcase recess, machining the non-machined crankcase end surface to provide a finished crankcase cover mounting surface co-planar with the diameter of the crankcase recess, boring the non-machined cylinder bore to provide a finished cylinder bore with a shoulder which is located at the end of the finished cylinder bore remote from the non-machined cylinder head end surface and at a first given distance from the axis and with a counter bore at the other end thereof and adjacent the non-machined cylinder head end surface and including a bottom surface at a second given distance from said axis by employing a unitary boring bar having a first part which produces the shoulder and a second part which simultaneously produces the counter bore, inserting the cylinder liner into the finished cylinder bore with a first end thereof in engagement with the shoulder and with a second end thereof adjacent the non-machined cylinder head end surface, and machining the non-machined cylinder head end surface and the second end of the cylinder liner to provide a planar machined cylinder head mounting surface having therein an annular U-shaped recess located in surrounding relation to the second end of the cylinder liner and to locate the cylinder head mounting surface at a third given distance from the axis.

4. A method in accordance with claim 3 wherein said casting step includes casting the cylinder block with a non-machined closed end cylinder head surface.

* * * * *